United States Patent [19]
Shih et al.

[11] Patent Number: 6,156,829
[45] Date of Patent: Dec. 5, 2000

[54] PRODUCT AND PROCESS FOR MAKING QUATERNIZED, WATER SOLUBLE VINYLPYRIDINE CARBOXYLATE POLYMERS

[75] Inventors: Jenn S. Shih, Paramus; Eduardo T. Yap, Franklin Lakes; John C. Hornby, Washington Township; Bala Srinivas, Hasbrouck Heights, all of N.J.

[73] Assignee: ISP Investments Inc., Wilmington, Del.

[21] Appl. No.: 09/211,734

[22] Filed: Dec. 15, 1998

[51] Int. Cl.$^7$ .......................... C08F 120/56; C08L 33/24; C08G 63/56; C08G 63/16; C07D 213/20

[52] U.S. Cl. .............................. 524/99; 524/457; 524/458; 525/191; 525/205; 525/218; 525/329.4; 525/333.3; 526/72; 526/213; 526/258; 528/502 A; 528/503; 546/347

[58] Field of Search ................................ 546/347; 526/72, 526/213, 258; 524/99, 457, 458; 525/191, 205, 218, 329.4, 333.3; 528/502 A, 528

[56] References Cited

U.S. PATENT DOCUMENTS

| | | | |
|---|---|---|---|
| 4,362,812 | 12/1982 | Minamizono et al. | 430/528 |
| 5,459,007 | 10/1995 | Larson et al. | 430/115 |
| 5,573,882 | 11/1996 | Larson et al. | 430/115 |

*Primary Examiner*—Alan L. Rotman
*Attorney, Agent, or Firm*—Marilyn J. Maue; William J. Davis; Walter Katz

[57] ABSTRACT

This invention relates to stable, quaternized vinylpyridine carboxylate co-polymers, useful as dye transfer inhibitors and polymers complexable with active agrochemicals or pharmaceuticals for controlled release thereof, and to a commercial process for the synthesis thereof in high yield and purity.

13 Claims, No Drawings

PRODUCT AND PROCESS FOR MAKING QUATERNIZED, WATER SOLUBLE VINYLPYRIDINE CARBOXYLATE POLYMERS

BACKGROUND OF THE INVENTION

1. Field of the Invention

This invention relates to novel quaternized, dye-complexable N-vinylpyridine carboxylate polymers, and to the process for their preparation involving water based polymerization of N-vinyl pyridine monomer and subsequent quaternization of the resulting vinyl pyridine polymer emulsion.

2. Description of the Prior Art

Dye complexing polymers have been used in laundry detergent and fabric softener compositions to stabilize and minimize leaching of dyes in colored fabrics. During washing of colored and white fabrics, some of the dyes can bleed out of a colored fabric and a portion of the leached dye may deposit on white or lighter colored fabrics. The degree of bleeding is influenced by the character of the dye, the type of cloth and the pH, temperature and mechanical efficiency of the agitation process. Although in some cases the bled dye in the wash liquor can be washed off without altering the color of lighter colored fabrics, the dyed fabric looses a degree of brilliance resulting in a somewhat faded appearance. Often it is found that the fugitive dye deposits either onto the same fabric or onto another fabric leading to patches and streaks in the washed material. This deposition of the bled dye can be inhibited in several ways. One method involves the use of a dye transfer inhibitor (DTI) compound which can complex with the dye and minimize leaching or at least prevent redeposition on the same or other fabrics.

Polyvinylpyrrolidone (PVP), by virtue of its dye complexation ability, has been used to inhibit dye deposition during washing of colored fabrics under laundry conditions. The performance of PVP as a DTI, however, is adversely affected by the presence of anionic surfactants usually present in the washing process.

Vinylpyridine polymers such as those disclosed in U.S. Pat. No. 4,824,910 and in our previous U.S. patent application Ser. No. 932,448, now U.S. Pat. No. 5,776,879, were formerly synthesized in alcoholic media; however, the product of this process contains significantly high unreacted monomer for a given period of reaction time and requires separation of organic solvent to recover pure polymer product. Costly and time consuming treatments are employed to remove impurities with the organic solvent in order to recover a purified product having no objectionable color.

Accordingly, it is an object of this invention to provide quaternized, complexable vinyl pyridine carboxylate polymers and an improved process for the preparation of the non-quaternized polymers, subsequent to their quaternization, which are soluble in water.

Another object is to provide an economical and commercially feasible process for the preparation of a water soluble dye transfer inhibitor and agrochemically or pharmaceutically complexable polymers, which are obtained in high purity suitable for immediate use in formulations.

A further feature of the invention is the provision of a water soluble poly(vinylpyridine polymer) containing a quaternary nitrogen and a carboxylate salt in high yield and purity.

Another object of the invention is to provide a laundry detergent composition which effectively resists fabric dye transfer during the washing and rinsing cycles, even in the presence of anionic surfactants. These and many other benefits and advantages of this invention will become apparent from the following description and disclosure.

SUMMARY OF THE INVENTION

This invention is directed to an a quaternized water soluble vinyl pyridine carboxylate polymer and to the economic and commercially desirable process for synthesizing the water soluble quaternized vinylpyridine carboxylate polymer product in high yield and purity which product is stable in aqueous and water media. The quaternized polymeric product of this invention, which is obtained in water solution or in powder form, contains (a) from 30 to 100 wt. % of a quaternized monomer having 20 to 5,000 quaternized units, preferably 100 to 2,500 units, of the structure

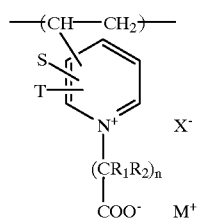

(b) 0 to 30 wt. of a non-quaternized vinylpyridine unit having the structure

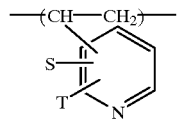

and (c) 0 to 70 wt. % of an unsaturated polymerizable comonomer wherein X is an anion; M is a cation, preferably an alkali metal such as sodium or potassium; $R_1$ and $R_2$ are independently hydrogen, hydroxy, alkyl, aryl, carboxy, an alkali metal salt of a carboxylic acid or a $C_2$ to $C_5$ carboxylate optionally substituted with halogen; S and T are each independently hydrogen or $C_1$ to $C_4$ alkyl; and n has a value of 1–5. The copolymer containing 70–95% (a) and 5–30% (c), with only a trace of (b), is an exceptionally good complexing agent for many pharmaceuticals and agrochemicals requiring film forming properties.

The above quaternized polymer contains both a quaternary nitrogen and a carboxylate salt. This polymer possesses superior complexing properties with dyes, drugs, pesticides and plant growth regulants and with other active components for use in a wide variety of applications. For example its dye complexing property provides excellent dye transfer inhibition in laundry and rinse formulations for cleansing of fabrics.

The comonomers of the above polymers are free radical polymerizable comonomers including styrene, alkyl styrene, N-vinylpyrrolidone, N-vinyl caprolactam, vinyl imidazole, N-vinyl amide, a lower alkyl acrylate, a lower alkyl methacrylate, acrylamide, methacrylamide and the like and mixtures thereof.

The preferred products of the present process are polymers in which X is a halide; particularly chloride or bromide; $R_1$ and $R_2$ are both hydrogen; n has a value of 1–3; M is an alkali metal, particularly sodium or potassium; and the polymer is 75–100% quaternized.

The polymer products of the present process have a weight average molecular weight of from about 5,000 to about 1,000,000; preferably from 20,000 to 500,000.

DETAILED DESCRIPTION OF THE INVENTION

In accordance with this invention there is provided an economical and commercially feasible process for the synthesis of a quaternized vinylpyridine carboxylate salt polymer (QPVPYR), including those polymer products described in the above summary. The polymers of the process are preferably those containing from 100 to 2,000 monomer units; which polymers or copolymers are particularly useful at a concentration of from about 2 to about 1,000 ppm in a laundry detergent or rinse, a drug or agrichemical formulation, ink and paint compositions. etc. to inhibit the migration of dye or to complex with an active chemical for contolled release.

The vinyl pyridine polymer reactant of the present invention, containing 0 to 70 wt. % comonomer, can be obtained by any.prior process for vinylpyridine polymerization, including solution, emulsion and precipitation polymerization processes in which a suitable solvent such as a $C_1$ to $C_4$ alkanol, water or a mixture thereof is employed (see U.S. Pat. Nos. 5,627,151 and 5,458,809; EP 0664332A and J. of Polymer Science 26/No.113/pp25–254/ 1957). The products of the polymerization reaction are obtained as an emulsion, suspension, dispersion or as fine dry particles or powder. As feed to the quaternization zone of the present process, the vinylpyridine polymer is employed as a water mixture containing from about 20 to about 50 wt. % solids. The quaternization is carried out under constant agitation at a temperature of between 40 and about 140° C., preferably between 70° and 120° C., optionally under a blanket of inert gas and in the presence of an aqueous solution of the selected quaternizing agent until the desired degree of quaternization occurs. In a preferred embodiment, the quaternized polymer products of the present invention are derived from a water based polymerization of monomers to non-quaternized vinyl pyridine polymers described in my copending U.S. patent application filed cocurrently herewith (FDN-2571A). The water emulsion containing the polymer described in the later application are treated as an intermediate product when using the preferred polymerization process and the intermediate is then subjected to quaternization to produce the quaternized products of this invention in high yield and purity.

More specifically, in the preferred process,the polymerization of vinyl pyridine, in the presence or absence of comonomer, is effected in water at a temperature of between about 40° and about 140° C., preferably between about 60° and about 100° C. The polymerization reaction defined by the equation:

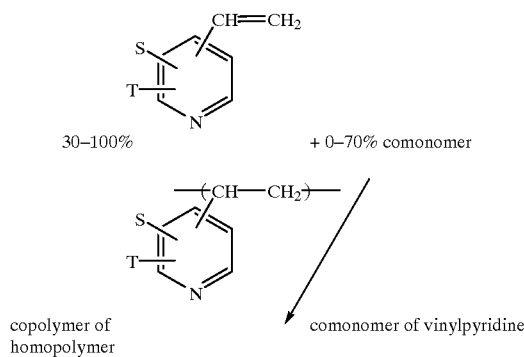

is conducted in the presence of a water soluble suspension agent and a free radical polymerization initiator, such as a peroxide, perester, percarbonate, redox initiator or a diazo compound. The polymer product of this invention can be obtained in a wide range of molecular weights which include a number average molecular weight of from about 10,000 to about 1,000,000, preferably from about 20,000 to about 500,000.

In the above process, the molecular weight of the non-quaternized polymer can be varied according to preference by several methods. For example, lower molecular weights are obtained at the higher temperatures within the above range, a higher concentration of initiator generally results in lower molecular weight product and the incorporation of a small amount, e.g. 0.5 to 20 wt. %, preferably 0.5 to 10 wt. %, of chain transfer agent, such as an alkyl thiol, isopropyl alcohol and the like, also provides lower molecular weight polymer.

The water soluble suspension agent of this invention is employed at a concentration of from about 0.75 to about 20 wt. %, preferably from about 1 to about 10 wt. %. Suitable suspension agents for the product polymer include a poly vinyl lactam, particularly polyvinylpyrrolidone having a K value of 12 to 120, hydroxyethyl cellulose, a polyvinyl alcohol, carboxymethyl cellulose and other inert water soluble types and mixtures thereof. Of these, polyvinylpyrrolidone is preferred. The suspension agent can also be added with an appropriate emulsifier, hereinafter described.

Initially, in accordance with the preferred process, the vinyl pyridine monomer, in the presence or absence of comonomer, is mixed with the suspension agent and water at ambient temperature under constant agitation and a blanket of inert gas. The resulting mixture is then heated to reaction temperature while the free radical initiator is added continuously or in increments during a 1 to 8 hour reaction period or until the monomer concentration in the reactor is below 1 wt. %. The resulting non-quaternized intermediate polymer product, suspended in water, is recovered as small particles as a stable emulsion or used directly in the quaternization zone.

The water emulsion containing from about 20 to about 50% solids of non-quaternized vinyl pyridine polymer intermediate is then contacted with a water soluble alkali metal halide or an alkali metal salt of a halogenated $C_1$ to $C_4$ carboxy acid or ester most preferably at a temperature of between about 70° and about 100° C. accompanied with vigorous agitation until the quaternization is completed. The concentration of quaternizing agent employed depends on the number of quaternizable nitrogen sites in the polymer and the degree of quaternization desired. Generally, between about 0.5 and about 1.5 moles of quaternizing agent per nitrogen in the polymer is utilized. The resulting vinyl betaine polymer containing monomer units having quaternized nitrogen and carboxylate metal salt moieties is suitable for incorporation into a detergent or dye formulation without further purification.

Specific agents suitable to effect the quaternization of the vinyl pyridine polymer include an alkali metal salt of a halogenated carboxylic acid such as for example a sodium or potassium salt of chloro- or bromo-acetic acid; 3-chloro- or 3-bromo-propionic acid; 4-chloro- or 4-bromo-butyric acid; 2,2-dimethyl-3-chloro propionic acid; halomaleic acid, e.g. sodium 2-chloromaleate; haloglutaric acid, e.g. sodium 2-chloroglutarate; haloadipic acid, e.g. sodium 2-chloroadipate; and halopimelic acid, e.g. sodium 2-chloropimelate and the like and mixtures thereof.

The vinylpyridine monomer in the above polymerization can contain an amount, less than 70 wt. %, of a comonomer for certain applications required by the consumer. Suitable comonomers utilized in the polymerization stage of the process include those referred to above. in which case the copolymer is recoverable in the same state of purity and small particle size.

Specific examples of free radical polymerization initiators employed in the process include t-butyl peroxy pivalate (LUPERSOL 11); t-amylperoxy pivalate (LUPERSOL 554); t-amyl-(2-ethylhexyl)peroxy carbonate (LUPERSOL TAEC); 1,1-di-(t-amylperoxy)cyclohexane (LUPERSOL 531); azo bis(2-methylbutyronitrile (VAZO 67); azo bis (isovaleronitrile (VAZO 52); azo bis(cyclohexane carbonitrile (VAZO 88) and the like and mixtures of the same. Low temperature initiators include the diacyl peroxides, diesters and azo compounds. High temperature initiators, which may be employed in the final stages of polymerization include 2,5-dimethyl-2,5-di-(t-butylperoxy)hexane (LUPERSOL 101); ethyl-2,5-di-(t-butylperoxy) hexane; dicumyl peroxide; t-butylcumyl peroxide; t-butylperoxy maleic acid; ethyl-3,3-di(t-butylperoxy) butyrate; di-t-butyl-diperoxy phthalate and the like.

If desired the polymerization reaction mixture can also contain up to about 10 wt. % of an emulsifier surfactant based on total monomer, including cationic, non-ionic, anionic, amphoteric and zwitterionic emulsifiers, such as one or a mixture of those disclosed at columns 8–16 of U.S. Pat. No. 5,458,809; incorporated herein by reference. Specific examples of these water soluble emulsifiers include an alkali metal sulfonate such as sodium or potassium dodecylbenzene sulfonate (LAS); coconut trimethyl ammonium chloride or bromide, N-coco-3-aminopropionic acid, triethanol oleate, sodium or potassium oleate, N-cetyl-N-ethyl morpholinium ethosulfate, sodium or potassium lauryl sulfate, lauryl alcohol polyether, polyethoxylated sorbitan monolaurate (TWEEN 20) and the like or a mixture thereof in the presence or absence of a suspension agent.

Having generally described the invention, reference is now had to the following examples which illustrate preferred embodiments but which are not to be construed as limiting to the scope of the invention as set forth in the appended claims.

EXAMPLE 1

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of K-30 poly(vinylpyrrolidone) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of t-butyl peroxypivalate (Lupersol 11) was added to the mixture and agitation was continued for one hour; after which 0.5 g. of Lupersol 101 was added and the temperature in the kettle was raised to 110° C. the reaction continued under agitation for an additional 8 hours until only a trace of unconverted monomer remained. Poly(4-vinylpyridine) of molecular weight about 100,000 was recovered as a water suspension of 95 wt. % microparticles of substantially pure poly(4-vinylpyridine). The polymer was dried overnight in an oven and 30 grams of the dried polymer was then contacted with 94.5 grams of water and 33.0 grams of sodium chloroacetate. The reaction mixture was held at 85° C. for 2 hours under constant agitation and then recovered as the quaternized product of the process.

EXAMPLE 2

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of polyvinyl alcohol (98% hydrolysis, MW=10,000–30,000) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of t-butyl peroxypivalate (Lupersol 11) was added to the mixture and agitation was continued for one hour; after which 0.5 g. of Lupersol 101 was added and the temperature in the kettle was raised to 110° C. the reaction continued under agitation for an additional 8 hours until only a trace of unconverted monomer remained.

The above water suspension was then converted to 40% solids solution by adding 66.4 g. of sodium chloroacetate into the kettle. The reaction mixture was held at 85° C. for 2 hours under constant agitation and then recovered as the quaternized product of the process.

EXAMPLE 3

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of polyvinyl alcohol (98% hydrolysis, MW=10,000–30,000) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of Vazo 67 was added to the mixture and agitation was continued for one hour; after which 0.5 g. of Vazo 67 was added every hour and the temperature in the kettle was kept at 85° C. for 6 hours.

The above water suspension was converted to 40% solids solution by adding 66.4 g. of sodium chloroacetate into the kettle. The reaction mixture was held at 85° C. for 2 hours under constant agitation and then recovered as the quaternized product of the process.

EXAMPLE 4

Example 3 was repeated except that 5.0 g of Vazo 67 was used in place of 1.0 g of Vazo 67 in the initial charge. The same quaternized polymer was recovered in good yield and high purity.

EXAMPLE 5

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of K-30 poly(vinylpyrrolidone) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of t-butyl peroxypivalate (Lupersol 11) was added to the mixture and agitation was continued for one hour; after which 0.5 g. of Lupersol 11 was added every hour and the temperature in the kettle was kept at 85° C. for 6 hours or until only a trace of unconverted monomer remained. The resulting poly(4-vinylpyridine) of molecular weight about 100,000 was recovered as a water suspension of 95 wt. % microparticles of substantially pure poly(4-vinylpyridine).

The above water suspension was then converted to 40% solids solution by adding 66.4 g. of sodium chloroacetate into the kettle. The reaction mixture was held at 85° C. for 2 hours under constant agitation and then recovered as the substantially pure quaternized product of the process.

What is claimed is:

1. A quaternized, water soluble vinyl pyridine carboxylate polymer suspension having dye transfer inhibiting properties containing
   (a) at least 30 wt. % quaternized units having the structure

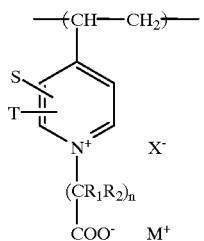

(b) a non-quarternized vinyl pyridine monomer unit in an amount up to 30 wt. % having the structure

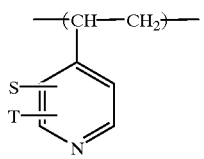

and
   (c) 0 to less than 70 wt. % of a free radical polymerizable comonomer unit which comonomer is selected from the group consisting of styrene, lower alkyl styrene, lower alkyl acrylate, lower alkyl methacrylate, N-vinyl pyrrolidone, N-vinyl caprolactam, acrylamide, methacrylamide, vinyl amide, vinyl imidazole and mixtures thereof;
   wherein X is an anion; M is an alkali metal; $R_1$ and $R_2$ in the expression $(CR_1R_2)_n$, are each independently hydrogen, lower alkyl or aryl, S and T are each independently hydrogen or $C_1$ to $C_4$ alkyl and n has a value of 1 to 5.

2. The polymer of claim 1 wherein n has a value of 1–3.

3. The polymer of claim 1 wherein M is sodium or potassium.

4. The polymer of claim 1 wherein X is halogen.

5. The polymer of claim 4 wherein X is chlorine or bromine.

6. The polymer of claim 1 wherein S and T are hydrogen.

7. The polymer of one of claims 1 or 6 which has a weight average molecular weight of between about 5,000 and about 1,000,000.

8. The polymer of one of claims 1 or 7 having a weight average molecular weight of between about 20,000 and about 500,000.

9. The process for the preparation of a stable, quaternized vinylpyridine carboxylate polymer which comprises:
   (a) mixing a vinyl pyridine monomer, having the formula

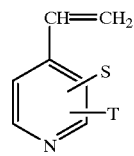

wherein S and T are each independently hydrogen or lower alkyl and optionally a free radical polymerizable comonomer with water in the presence of between about 10 and about 40 wt. % of a water soluble suspension agent at below polymerization temperature;
   (b) gradually heating the mixture of (a) to polymerization temperature while introducing a polymerization initiating amount of a polymerization initiator;
   (c) polymerizing monomer while adding portions of initiator throughout the polymerization until the monomer concentration is below 1 wt. %;
   (d) recovering the resulting vinyl pyridine polymer and mixing said polymer with water to provide a mixture containing between about 20 and about 50% solids;
   (e) adding a quaternizing agent and quaternizing said vinylpyridine polymer at a temperature between about 40° and about 140° C. until the desired degree of quaternization occurs and
   (f) recovering the resulting quaternized polymer suspension as the product of the process.

10. The process of claim 9 wherein said comonomer is selected from the group consisting of styrene, lower alkyl styrene, lower alkyl acrylate, lower aklyl methacrylate, N-vinylpyrrolidone, N-vinyl caprolactam, vinyl amide, acrylamide, methacrylamide, vinyl imidazole and a mixture thereof.

11. The process of one of claims 9 or 10 wherein S and T are hydrogen.

12. The process of one of claims 9 or 10 wherein said quaternizing agent is an alkali metal salt of a halogenated carboxylic acid selected from the group consisting of a sodium or potassium salt of chloro- or bromo-acetic acid; 3-chloro- or 3-bromo-propionic acid; 4-chloro- or 4-bromo-butyric acid; halomaleic acid; haloglutaric acid; haloadipic acid; and halopimelic acid and mixtures thereof.

13. An aqueous composition containing an effective chemically active amount of a component selected from the group of an active detergent, an active pharmaceutical and an active agrochemical and between about 2 and about 1,000 ppm of the quaternized vinyl pyridine carboxylate polymer of claim 1.

* * * * *